(12) United States Patent
Sakonjo et al.

(10) Patent No.: US 7,138,167 B2
(45) Date of Patent: Nov. 21, 2006

(54) PREFORM PRECURSOR FOR FIBER-REINFORCED COMPOSITE MATERIAL, PREFORM FOR FIBER-REINFORCED COMPOSITE MATERIAL, AND METHOD OF MANUFACTURING THE PRECURSOR AND THE PREFORM

(75) Inventors: Hideki Sakonjo, Osaka-fu (JP); Masayasu Ishibashi, Osaka-fu (JP); Takeshi Tanamura, Osaka-fu (JP); Koichi Hashimoto, Osaka-fu (JP); Tetsuro Hirokawa, Osaka-fu (JP)

(73) Assignee: Shikibo Ltd., Osaka (JP)

( * ) Notice: Subject to any disclaimer, the term of this patent is extended or adjusted under 35 U.S.C. 154(b) by 0 days.

(21) Appl. No.: 10/489,860

(22) PCT Filed: Aug. 12, 2002

(86) PCT No.: PCT/JP02/08219

§ 371 (c)(1),
(2), (4) Date: Oct. 1, 2004

(87) PCT Pub. No.: WO2004/016844

PCT Pub. Date: Feb. 26, 2004

(65) Prior Publication Data

US 2005/0042410 A1 Feb. 24, 2005

(51) Int. Cl.
*B32B 5/12* (2006.01)
(52) U.S. Cl. .............. 428/107; 428/66.6; 156/221; 28/247; 57/238; 57/278; 57/59; 57/362
(58) Field of Classification Search ............ 57/2, 57/206, 204, 238, 243, 278, 59, 362; 28/253, 28/115, 226, 247, 103; 428/107, 66.6; 156/221
See application file for complete search history.

(56) References Cited

U.S. PATENT DOCUMENTS

| 4,674,271 A | * | 6/1987 | Bird | ............................ 57/2 |
| 6,311,375 B1 | * | 11/2001 | Patrick | ....................... 28/253 |
| 6,796,115 B1 | * | 9/2004 | Patrick | ....................... 57/210 |

FOREIGN PATENT DOCUMENTS

| JP | 11-34202 A | 2/1999 |
| JP | 11-189963 A | 7/1999 |
| JP | 2002-3280 A | 1/2002 |
| WO | WO 92/04492 A1 | 3/1992 |

* cited by examiner

*Primary Examiner*—Merrick Dixon
(74) *Attorney, Agent, or Firm*—Arent Fox PLLC (57) ABSTRACT

A preform for a fiber-reinforced composite material including a bent portion along a curved line for bending, a flange portion corresponding to an outer circumferential portion, and a semi-cylindrical portion formed by bending an inner circumferential portion along the curved line for bending located in a flat plane or a curved plane region. The preform is formed from a precursor having a predetermined extension. The outer circumferential portion corresponds to a first region where a first plurality of reinforced fibers is partially disposed in parallel along the curved line for bending. The inner circumferential portion corresponds to a second region constituted solely of a second plurality of reinforced fibers disposed throughout the entire area, so as to intersect the first plurality of reinforced fibers at a predetermined angle in the first region.

19 Claims, 4 Drawing Sheets

PREFORM PRECURSOR FOR FIBER-REINFORCED COMPOSITE MATERIAL, PREFORM FOR FIBER-REINFORCED COMPOSITE MATERIAL, AND METHOD OF MANUFACTURING THE PRECURSOR AND THE PREFORM

CROSS-REFERENCE TO RELATED APPLICATION

This application is a National Stage entry of International Application Number PCTIJP02/08219, filed Aug. 12, 2002. The disclosure of the prior application is hereby incorporated herein in its entirety by reference.

TECHNICAL FIELD

The present invention relates to a precursor of a preform for a fiber-reinforced composite material and a preform for a fiber-reinforced composite material formed of a reinforcing fiber, to be used as a structural member that has to have a prescribed strength in an aircraft, an automobile, a vessel, a constructed structure, etc., especially in a circular bore portion or a curved portion such as a wing or a body of an aircraft, and to a method of manufacturing such preform.

BACKGROUND ART

Conventionally, metal materials including a particular aluminum alloy, a titanium alloy or a stainless steel have been mainly used as a structural member of an aircraft such as a wing, body, a window frame or a circular bore portion such as a fuel inlet, because of having sufficient mechanical strength to be used in the cited sections, and strength characteristics appropriate to stress characteristics of these sections. However, in order to satisfy a strength requirement of an aircraft, a multitude of metal structural members, each of which has a considerable weight, have to be used; therefore a total weight of the aircraft inevitably becomes heavy. Accordingly, degree of designing freedom is significantly restrained, and in a practical aspect a huge amount of fuel is consumed in each flight; therefore making light-weighted aircraft components has been a critical issue from the viewpoint of manufacturing, operation and safety of an aircraft.

Lately studies have been progressing on manufacturing a structural member of an aircraft with a fiber-reinforced composite material having a high specific strength constituted of a reinforced fiber including a glass fiber, an aramid fiber or a carbon fiber impregnated with a polymer matrix such as an epoxy resin, and currently a considerable number of materials are in practical use. It is known in the art that a composite material has a superior specific strength and specific rigidity to metal materials, and it is also well known that a composite material offers higher degree of freedom in the structure design because of anisotropy that is characteristic of a reinforced fiber. Besides, since formation of a single piece of large-scale structural member is possible, a number of parts can be substantially reduced, and resultantly the manufacturing cost can be lowered.

TECHNICAL PROBLEM TO BE SOLVED BY THE INVENTION

However, in case of forming a predetermined shape partly or entirely having a curvature such as a circular or bended shape, currently a hand lay-up method is employed wherein a prepreg sheet made of a reinforced fiber impregnated in advance with a resin is cut in pieces, and a multitude of cut prepregs are joined to form a desired shape as disclosed in the JP-A No.H07-081566, however this method has a drawback of low productivity since a major part of the operation is performed by hand labor; there are numerous manufacturing steps; automation is difficult; and considerable material loss is incurred. Besides, in a material formed in this way the reinforced fiber of a circular or bended shape is divided in sections; therefore sufficient strength expected from a reinforced fiber cannot be achieved.

Likewise, a technique called "ATL" (automated tape lay-up, also called as "fiber placement") in which a prepreg is employed is known in the art such as the method disclosed in the U.S. Pat. No. 6,096,164, and is actually applied to materials having a curved face, however this method is not applicable to a material of a complicated shape having an irregular cross-section such as an I-shape, an L-shape, a T-shape or a hat-shape cross-section.

Also, a manufacturing method employing a fabric of a reinforced fiber has been conventionally known in the art. For example, the method includes forming a fabric in a desired shape such as a disk or a spiral, however since such method includes steps of weaving a fiber into a fabric, the manufacturing cost becomes higher; besides additional steps such as cutting or stacking the fabric are required, which further increases the manufacturing cost (references: JP-A No.S57-1333242, JP-A No.H07-249234, JP-A No.H04-108138, JP-A No.H06-264327, JP-A No.H07-133548, JP-A No.2002-3280).

Further, a fabric made of a reinforced fiber having an irregular cross-section such as an I-shape, an H-shape, a T-shape has been proposed (JP-A No.S57-133241), however since the fabric is woven by a loom, the reinforced fiber cannot be oriented in other directions than 0 degrees or 90 degrees, and basically this literature does not relate to achieving a curvature.

Furthermore, JP-A No.S63-120153 and No.H02-191742 provide a method that enables manufacturing of a curved structure by varying a fiber structure of a fabric; however because of the nature of a woven fabric the fiber inevitably has a crimped shape, and therefore the structure cannot have sufficient strength. Besides this method is not suitable for mass production because numerous manufacturing steps are required, and also the structure can only be formed in a limited shape because the structure is not intended for a use in combination with another material.

Still further a method of manufacturing a composite material utilizing a braided base material constituted of braided reinforced fiber is disclosed in the JP-A No.H10-290851, however since a woven, braided or knitted fabric is generally constituted of a crimped fiber, the braided material cannot have sufficient strength; besides the manufacturing cost becomes higher as in the case of utilizing a woven fabric. In addition, in case of increasing an amount of the reinforced fiber in order to satisfy required strength, an amount of the reinforced fiber provided in a direction that does not contribute in increasing the strength also has to be increased altogether, resulting in an increased overall weight and dimensions and consequently an increase of cost, sometimes without achieving the required strength despite such increase. Because of the foregoing reasons, application of a composite material to an aircraft designed for public service has not been accomplished to a satisfactory extent, as stated in the JP-A No.2000-328392). All such problems have to be solved.

Accordingly, the present invention has been conceived to solve the foregoing problems, with an object to provide a high-density and high-strength preform for a fiber-reinforced composite material that offers high application freedom to a solid shape; requires less manufacturing steps and time; produces less waste and is free from crimping of a fiber, and is therefore less expensive; and a method of manufacturing the same.

DISCLOSURE OF THE INVENTION

With an object to solve the foregoing problems, the present invention provides a precursor of a preform for a fiber-reinforced composite material provided with a portion that can be bent along a curved line in a flat plane or a curved plane region having a predetermined extension, comprising a plurality of reinforced fibers partly disposed in parallel without being formed into a structure along the curved line for bending; and a plurality of reinforced fibers intersecting the former plurality of reinforced fibers at a predetermined angle and disposed all over the region without being formed into a structure, for bending a portion solely constituted of the latter plurality of reinforced fibers to form a desired shape (a first aspect).

Here, the term of "without being formed into a structure" in the foregoing passage means that the reinforced fibers are not mutually woven or knitted as a woven, braided or knitted fabric.

The portion where the reinforced fibers are disposed in parallel without being formed into a structure along the curved line for bending has a nature that the reinforced fiber resists the bending force. This is because a fiber length of the reinforced fiber disposed in parallel along the curved line and that of the reinforced fiber after bending do not accord with each other. On the other hand, the portion solely constituted of the plurality of reinforced fibers intersecting at a predetermined angle with the reinforced fibers disposed in parallel along the curved line for bending can be easily bent without producing a wrinkle, owing to a variation of an interval between the fibers that takes place without varying the shape along the curved line. This is because the latter portion does not include a fiber provided in a direction that causes resistance against the bending force. By focusing on such nature, it becomes possible to provide a precursor of a preform for a fiber-reinforced composite material that can relatively easily constitute a curved irregular cross-section.

With an object to solve the foregoing problems, the present invention provides a preform for a fiber-reinforced composite material provided with a portion that can be bent along a curved line in a flat plane or a curved plane region having a predetermined extension, comprising a plurality of reinforced fibers partly disposed in parallel without being formed into a structure along the curved line for bending; and a plurality of reinforced fibers intersecting the former plurality of reinforced fibers at a predetermined angle and disposed all over the region without being formed into a structure; and formed into a desired shape by bending a portion constituted of the latter plurality of reinforced fibers (a second aspect).

The precursor of a preform for a fiber-reinforced composite material constituted as described in the first aspect acquires an irregular cross-section by being bent in a desired shape at the portion provided for the purpose of bending, thus to become a preform for a fiber-reinforced composite material. The present invention therefore permits manufacturing a curved preform for a fiber-reinforced composite material having different irregular cross-sections such as an I-shape, T-shape, L-shape or II-shape, which could only be achieved through complicated steps by a conventional technique.

Also, in the preform for a fiber-reinforced composite material of the second aspect, wherein a thickness thereof is partly or continuously varying according to a variation of a quantity and/or a diameter of the fiber to be used in the flat plane or curved plane region having a predetermined extension (a third aspect).

In case where different strength characteristics are dispersedly designed in a single structural material, a reinforced fiber has to be disposed in accordance with a strength requirement, which can be achieved by partly increasing or decreasing a thickness or a width of the fiber. The third aspect achieves the same effect also by partly varying a diameter of the reinforced fiber to be employed.

The preform for a fiber-reinforced composite material of the second and the third aspect may further comprise a portion that can be bent along a curved line orthogonal or substantially orthogonal to an axis of a cylindrical plane or a conical plane region having a predetermined extension; and in a shape including a part or a whole of a cylindrical or a conical shape defined by disposing a plurality of reinforced fibers orthogonally or substantially orthogonally to an axis thereof in parallel without forming a structure at a position along an axial direction, and another plurality of reinforced fibers intersecting the former plurality of reinforced fibers at a predetermined angle and disposed all over the region without forming a structure, the portion solely constituted of the latter reinforced fibers is bent in a desired shape along the curved line (a fourth aspect).

When forming a preform having a continuous disk shape on a cylindrical plane, a desired shape can be obtained by bending a part of a cylindrical precursor, without undergoing conventional complicated steps. In this case, the bent portion of the precursor may by directed either toward inside a circumference of the cylinder or toward outside. In case of a type that is bent along a line orthogonal to an axis of the cylinder, a cylindrical shape having a disk-shape flange portion can be obtained, and in case of bending along a line substantially orthogonal line to a cylinder axis, a cylindrical shape having a flange portion substantially orthogonally disposed thereto can be obtained.

The preform for a fiber-reinforced composite material of the second and the third aspect may further comprise a portion that can be bent along a circular or oval curved line in a disk-shape plane or an oval plane region having a predetermined extension; a plurality of reinforced fibers disposed in parallel without being formed into a structure along the curved line for bending at a portion along a radial direction; and another plurality of reinforced fibers intersecting the former plurality of reinforced fibers at a predetermined angle and disposed all over the region without being formed into a structure; and formed by bending a portion solely constituted of the latter plurality of reinforced fibers along the circular or oval curved line (a fifth aspect).

For example, when forming a disk-shaped preform with an opening having a continuous cylindrical plane on an inner circumferential portion thereof, a precursor of a preform is formed in a disk shape including an extra quantity of the fiber intended for constituting the additional cylindrical portion. In such precursor, as stated in the fifth aspect, it is only in a portion that maintains the disk shape after the bending is performed, that the fiber is disposed in parallel without being formed into a structure in a circumferential direction. After forming such precursor of a preform, the portion where the fiber is not provided in a circumferential direction in parallel is bent from the disk plane, thus to form a cylindrical plane.

Also, the present invention provides a preform for a fiber-reinforced composite material comprising a plurality of preforms for constituting a fiber-reinforced composite material selected as a base material out of those described in the second to fifth aspects, to be used in combination for forming a preform for a fiber-reinforced composite material having a predetermined three-dimensional shape and a predetermined orientation of the reinforced fiber (a sixth aspect).

Anisotropy of strength as a composite material can be varied depending on a layout of the reinforced fiber. For example, in a curved composite material having an L-shaped, I-shaped, T-shaped or II-shaped irregular cross-section, in case where strength is required in a curving direction all over the material, a preform for a fiber-reinforced composite material provided with a reinforced fiber disposed in the curving direction is required. In such case, a plurality of preforms for constituting a fiber-reinforced composite material selected out of those described in the second to the fifth aspects, in which the disposition of the reinforced fiber is respectively defined, are employed in combination that achieves the desired strength distribution. In this way, the reinforced fiber disposed in parallel along the curved line for bending can be included in a plurality of planes.

Also, the preform for a fiber-reinforced composite material described in one of the second to the sixth aspects may be formed in a unified body by stitching with a sewing machine; by knitting; by a needle-punching process; or by a thermo-compression bonding in case of employing a reinforced fiber impregnated with a fibriform thermoplastic resin (a seventh to eleventh aspects).

When forming the preform according to the present invention, in case where stitching or knitting has to be performed before bending a precursor of a preform, a method for an elastic material well known in the apparel industry such as a zigzag stitching or serrated stitching can be employed. This is also the case with an elastic sewing thread, and such materials can be appropriately employed as the case may be. Also, the stitching or knitting can be carried out on a desired portion after bending a precursor of a preform. For such purpose, a popular chemical fiber for sewing such as polyester or an organic fiber may be utilized, as well as a carbon fiber, a ceramic fiber or an aramid fiber, all of which are highly elastic, may be employed when strength in a thickness wise direction is required.

Also, a needle-punching process may form the preform for a fiber-reinforced composite material described in one of the second to the sixth aspects.

It may not be possible to employ the stitching or knitting process depending on a shape of the preform for a fiber-reinforced composite material. In such a case, it is advantageous to execute a needle-punching process as a bonding method of the reinforced fiber for retaining a shape of the preform for a fiber-reinforced composite material according to the present invention. The needle-punching process may be carried out either before or after the bending.

Also, the preform for a fiber-reinforced composite material described in one of the second to the sixth aspects may further comprise a fibriform thermoplastic resin used in combination with the reinforced fiber, to be formed by a thermo-compression bonding.

In case where the stitching, knitting or needle-punching process is not required, or difficult because of a shape of the preform, it is possible to utilize a fibriform thermoplastic resin in combination with the reinforced fiber, and to form a unified body by a thermo-compression bonding. Also, a resin for bonding may be separately provided after disposing the reinforced fiber.

Further, in case where strength in a thickness wise direction is required, for example by a stitching thread, a fibriform thermoplastic resin may be used in combination with the reinforced fiber for constituting a precursor of a preform, and then after appropriately providing a stitch and bending a portion that can be bent a thermo compression bonding may be performed to form a preform for a fiber-reinforced composite material in a desired shape. Such method is also applicable to a preform to be knitted. Such bonding in a thickness wise direction by the stitching, knitting or needle-punching process includes a drilling process of the base material in a thickness wise direction, which contributes in promoting a flow of a resin in a matrix impregnation process for forming a composite material, thereby improving the impregnation efficiency.

With an object to solve the foregoing problems, the present invention provides a method of manufacturing a preform for a fiber-reinforced composite material described in the fourth aspect provided with a portion that can be bent along a curved line orthogonal or substantially orthogonal to an axis in a region including a part or a whole of a cylindrical plane or a conical plane having a predetermined extension, comprising disposing a plurality of reinforced fibers orthogonally or substantially orthogonally to the axis thereof at a position along an axial direction in parallel without forming a structure; disposing a plurality of reinforced fibers intersecting the former plurality of reinforced fibers at a predetermined angle all over the region without forming a structure; and bending the portion solely constituted of the latter reinforced fiber in a desired shape along the curved line (a twelfth aspect).

According to this method, since the reinforced fiber along the curved line is not disposed in the portion to be bent along the curved line, it is possible to vary an inner or outer diameter of the portion to be bent along the curved line, and therefore the bending can be easily executed, thus to form a preform for a fiber-reinforced composite material in a desired three-dimensional shape.

Also, the present invention provides a method of manufacturing a preform for a fiber-reinforced composite material described in the fifth aspect provided with a portion that can be bent along a circular or oval curved line in a region including a part or a whole of a disk-shape plane or an oval plane having a predetermined extension, comprising disposing a plurality of reinforced fibers in parallel without forming a structure at a portion along a radial direction; disposing a plurality of reinforced fibers intersecting the former plurality of reinforced fibers at a predetermined angle all over the region without forming a structure; and bending a portion solely constituted of the latter plurality of reinforced fibers in a predetermined direction along the circular or oval curved line (a thirteenth aspect).

According to such method, since the reinforced fiber is not disposed in parallel along the circular or oval curved line in the portion that can be bent along a circular or oval curved line in a region including a part or a whole of a disk-shape plane or an oval plane, it is possible to vary an inner or outer diameter of the portion to be bent because of a variation of an interval between the fibers, and therefore the bending can be easily executed along the circular or oval curved line, thus to form a preform for a fiber-reinforced composite material in a desired three-dimensional shape.

Also, the present invention provides a method of manufacturing a preform for a fiber-reinforced composite material, comprising appropriately selecting a plurality of preforms for a fiber-reinforced composite material out of those described in the twelfth and the thirteenth aspects as base materials for constituting a preform for a fiber-reinforced composite material having a predetermined three-dimensional shape and orientation of the reinforced fiber; and combining the selected preforms for a fiber-reinforced composite material (a fourteenth aspect).

In case where it is difficult to form a preform for a fiber-reinforced composite material having a complicated three-dimensional shape and different orientations of the reinforced fiber with a single preform for a fiber-reinforced composite material, a preform for a fiber-reinforced composite material having a desired three-dimensional shape and orientations of the reinforced fiber can be obtained through a combination of a plurality of preforms for a fiber-reinforced composite material.

BEST MODE FOR CARRYING OUT THE INVENTION

Figure 1:
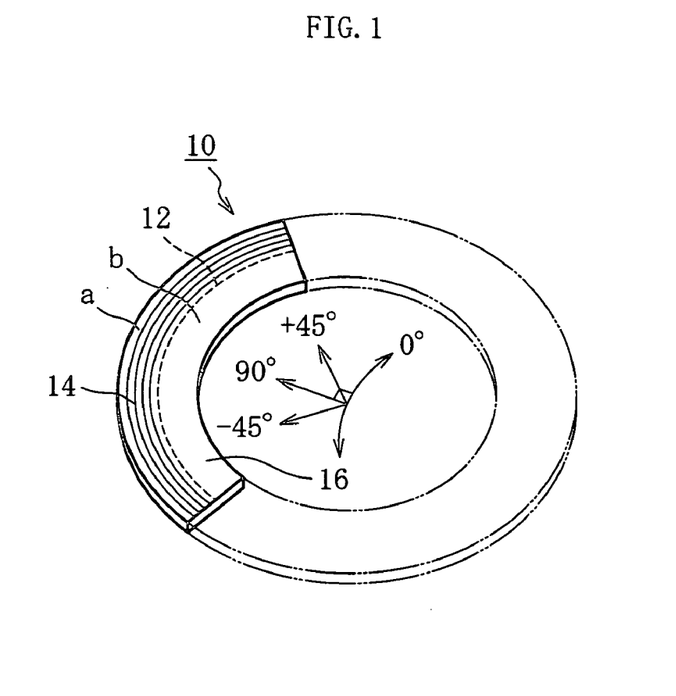
FIG. 1 is a perspective view showing a precursor of a preform for a fiber-reinforced composite material according to an embodiment of the present invention.

Hereunder, the best mode for carrying out the present invention will be described referring to the accompanying drawings. FIG. 1 is a perspective view showing a precursor of a preform for a fiber-reinforced composite material 10 having a curved shape in a flat plane, intended for forming a curved preform for a fiber-reinforced composite material having a typical L-shaped irregular cross-section according to an embodiment of the present invention. The curved precursor of a preform for a fiber-reinforced composite material 10 includes an outer circumferential portion 14 and an inner circumferential portion 16 divided by a curved line for bending 12. The outer circumferential portion 14 corresponds to a region a, where a plurality of reinforced fibers is disposed in parallel without being formed into a structure along the curved line for bending 12. The inner circumferential portion 16 corresponds to a section b, where solely another plurality of reinforced fibers is provided, out of the entire area where the latter plurality of reinforced fibers is disposed all over including the outer circumferential portion 14 so as to intersect with the former plurality of reinforced fibers at a predetermined angle. The plurality of reinforced fibers intersecting at a predetermined angle includes those disposed in parallel in one or more of the directions of +45 degrees, −45 degrees and 90 degrees, in case where a circumferential direction is designated as 0 degree as shown in FIG. 1, or a plurality of layers thereof. By the way, the reinforced fiber intersecting at a predetermined angle is omitted in FIG. 1 for the sake of simplicity, because of being disposed in common throughout the both of the region a and the section b, thus to only show the reinforced fibers disposed in parallel along the curved line for bending 12 of the region a, by which the region a and the section b are defined.

A stitching or knitting process is executed in a direction of 0 degrees in a form of broken lines at regular intervals over such reinforced fiber group. In this process, a zigzag or serrated stitch may be provided so as to cross the reinforced fiber of the 0 degree direction, to prevent the reinforced fiber of the 0 degree direction from moving in a direction of 90 degrees.

Figure 2:
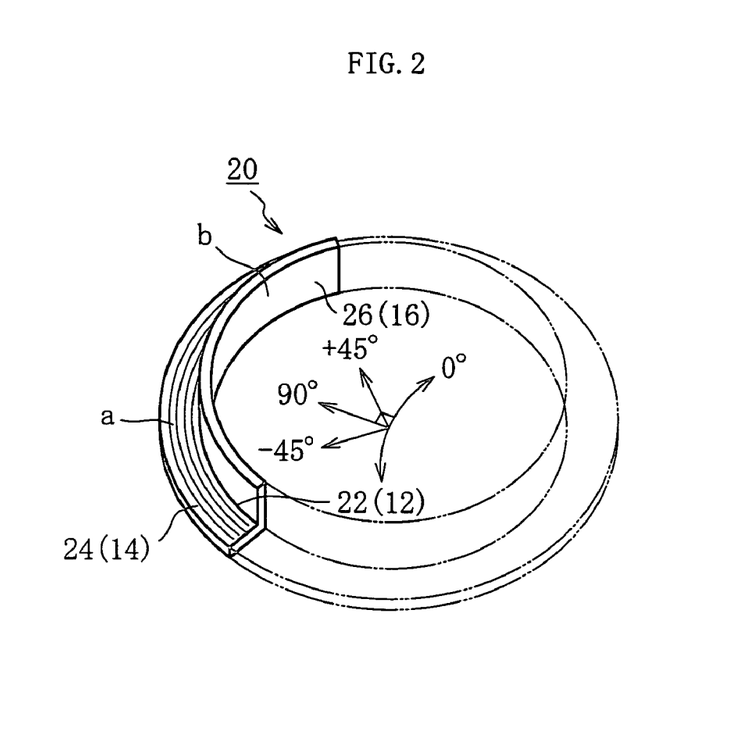
FIG. 2 is a perspective view showing a preform for a fiber-reinforced composite material according to the embodiment of the present invention, formed from the precursor of FIG. 1.

FIG. 2 is a perspective view showing a preform for a fiber-reinforced composite material 20 of a curved shape having a typical L-shaped irregular cross-section, formed by erecting the inner circumferential portion 16 of the curved precursor of a preform for a fiber-reinforced composite material 10 of FIG. 1 along the curved line for bending 12, in a direction of 90 degrees with respect to the plane of the precursor of a preform for a fiber-reinforced composite material 10. Referring to FIG. 2, numeral 22 indicates a portion to be bent corresponding to the curved line for bending 12 of FIG. 1. Numeral 24 indicates a flange portion corresponding to the outer circumferential portion 14 of FIG. 1, i.e. to the region a where the reinforced fibers are provided in the directions of 0 degree, +45 degrees, −45 degrees and 90 degrees as already described. Numeral 26 indicates a semi-cylindrical portion corresponding to the inner circumferential portion 16 of FIG. 1, i.e. to the section b where the reinforced fibers are provided in the directions of +45 degrees, −45 degrees and 90 degrees except 0 degree as described above. Since the reinforced fiber is not provided in the 0 degree direction in the inner circumferential portion 16, an interval between the respective fibers is widened when bending the inner circumferential portion 16 so that an inner diameter is smoothly enlarged in proportion to a distance from the portion to be bent when bending the inner circumferential portion 16, thereby smoothly forming the semi-cylindrical portion 26.

In case where a difficulty in erecting the semi-cylindrical portion is foreseen because of a nature of a thread to be used for stitching, which may not be suitable for an expected ratio of an inner and outer diameters to be determined as a result of the erecting process, it is preferable to select an elastic stitching thread or an elastic stitching method in advance.

The preform for a fiber-reinforced composite material 20 having an irregular cross-section as shown in FIG. 2 has conventionally been manufactured by cutting and layering a three-dimensional fabric, cloth material, braided or knitted material produced through numerous complicated steps, or by cutting a fabric impregnated with a semi-cured polymer resin in a predetermined shape and adhering such materials, all of which requires a multitude of complicated steps and a high cost. However the present invention has accomplished a simplified manufacturing process, through which required strength can be obtained at a reduced cost.

Figure 3:
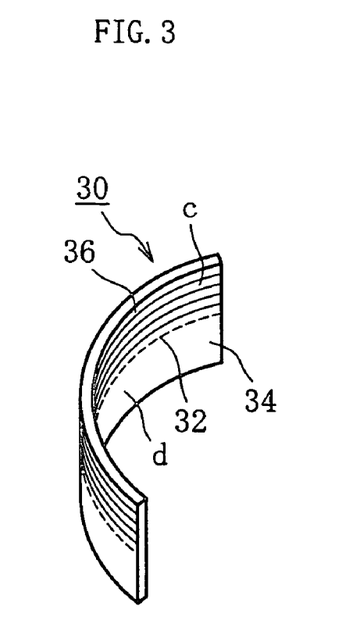
FIG. 3 is a perspective view showing a precursor of a preform for a fiber-reinforced composite material according to another embodiment of the present invention.

FIG. 3 is a perspective view showing a precursor of a preform for a fiber-reinforced composite material 30 bent in a semi-cylindrical shape, intended for forming a curved preform for a fiber-reinforced composite material having a L-shaped irregular cross-section according to another embodiment of the present invention. The semi-cylindrically curved precursor of a preform for a fiber-reinforced composite material 30 includes a lower portion 34 and an upper portion 36 divided by a curved line for bending 32. The upper portion 36 corresponds to a region c where a plurality of reinforced fibers is disposed in parallel without being formed into a structure in a direction of 0 degree along the curved line for bending 32. The lower portion 34 corresponds to a section d, where solely another plurality of reinforced fibers is provided, out of the entire area where the latter plurality of reinforced fibers is disposed all over including the upper portion 36 so as to intersect with the former plurality of reinforced fibers at a predetermined angle. The plurality of reinforced fibers intersecting at a predetermined angle includes those disposed in parallel in one or more of the directions of +45 degrees, −45 degrees and 90 degrees, in case where a direction along the curved line for bending 32 is designated as 0 degree, or a plurality of layers thereof. By the way, the reinforced fiber intersecting at a predetermined angle is omitted in FIG. 3 for the sake of simplicity, because of being disposed in common throughout the both of the region c and the section d, thus to only show the reinforced fibers disposed in parallel along the curved line for bending 32 of the region c, by which the region c and the section d are defined.

Figure 4:
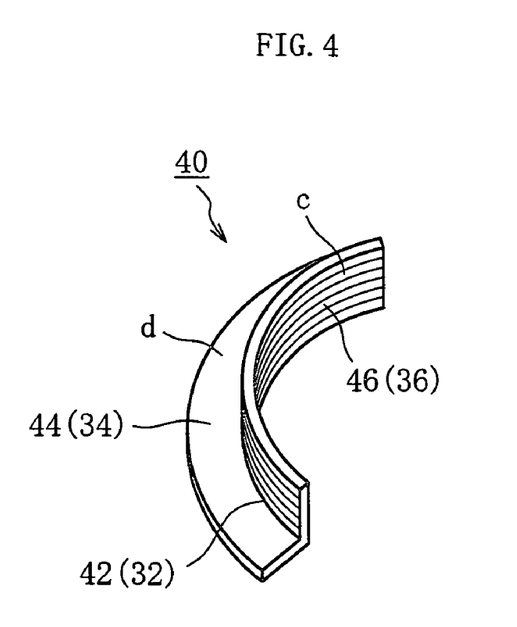
FIG. 4 is a perspective view showing a preform for a fiber-reinforced composite material according to the other embodiment of the present invention, formed from the precursor of FIG. 3.

FIG. 4 is a perspective view showing a preform for a fiber-reinforced composite material 40 of a curved shape having a typical L-shaped irregular cross-section, formed by outwardly erecting the lower portion 34 of the semi-cylindrically curved precursor of a preform for a fiber-reinforced composite material 30 of FIG. 3 along the curved line for bending 32, in a direction of 90 degrees with respect to the plane of the precursor of a preform for a fiber-reinforced composite material 30. Referring to FIG. 4, numeral 42 indicates a portion to be bent corresponding to the curved line for bending 32 of FIG. 3. Numeral 44 indicates a flange portion corresponding to the lower portion 34 of FIG. 3, i.e. to the section d where the reinforced fibers are provided in the directions of +45 degrees, −45 degrees and 90 degrees except 0 degree as described above. Numeral 46 indicates a semi-cylindrical portion corresponding to the upper portion 36 of FIG. 3, i.e. to the region c where the reinforced fibers are provided in the directions of 0 degree, +45 degrees, −45 degrees and 90 degrees as already described. Since the reinforced fiber is not provided in the 0 degree direction in the lower portion 34 as already stated when bending the lower portion 34, an interval between the respective fibers is varied when bending the lower portion 34 so that a diameter is smoothly enlarged in proportion to a distance from the portion to be bent, thereby smoothly forming the flange portion 44.

In case where a difficulty in erecting the semi-cylindrical portions B and D where the reinforced fiber is not provided in the direction of 0 degree in the foregoing embodiments is foreseen because of a nature of a thread to be used for stitching, which may not be suitable for an expected ratio of an inner and outer diameters to be determined as a result of the erecting process, it is preferable to select an elastic stitching thread or an elastic stitching method in advance.

Figure 5:
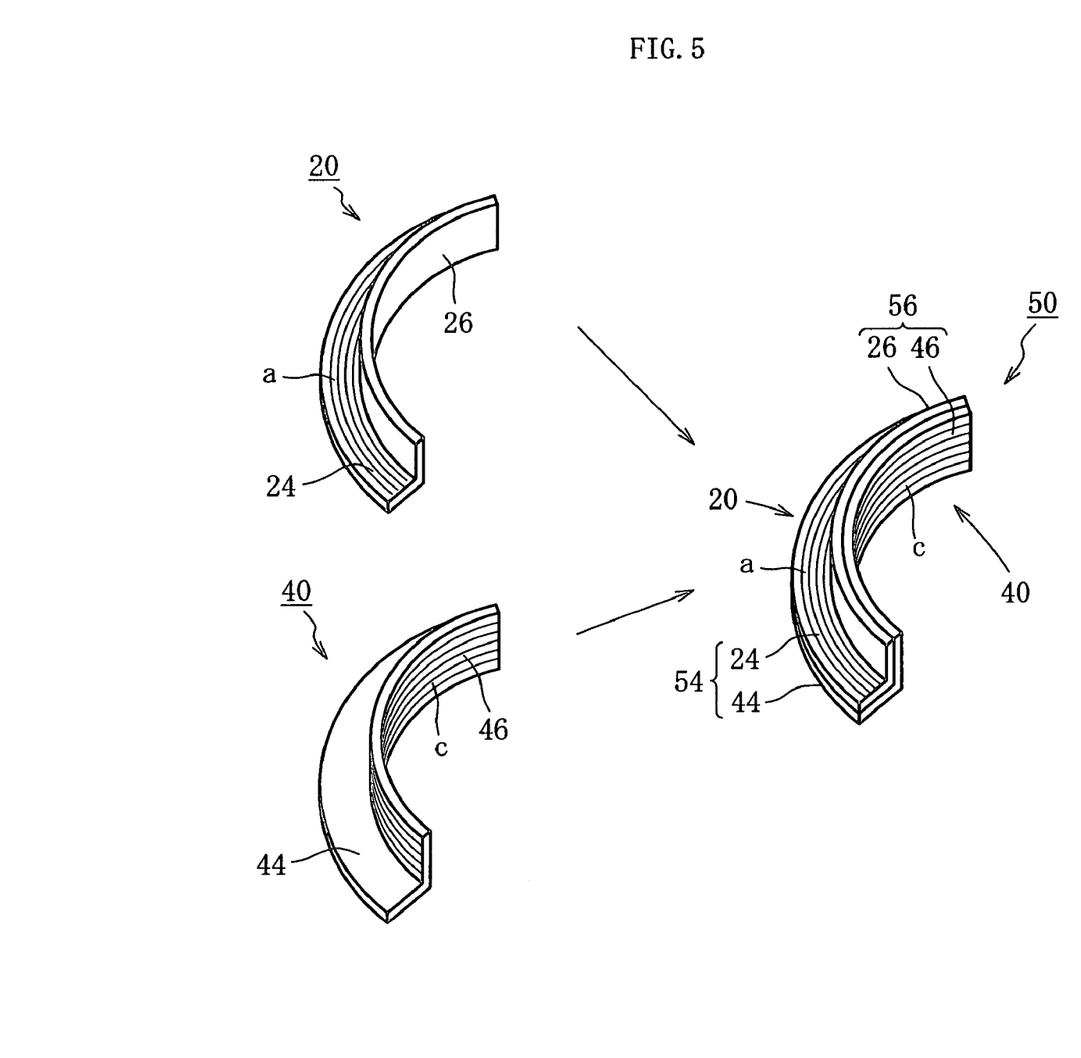
FIG. 5 includes perspective views showing a combined preform for a fiber-reinforced composite material formed through a combination of the preforms for a fiber-reinforced composite material of FIGS. 2 and 4.

The preforms for a fiber-reinforced composite material 20, 40 obtained as above may be impregnated with a polymer resin for a composing process in case where a single piece can be applied to an intended use, or the preforms for a fiber-reinforced composite material 20, 40 may be layered as shown in FIG. 5, before the impregnation and composing process.

Accordingly, FIG. 5 includes perspective views showing a combined preform for a fiber-reinforced composite material 50, formed in a unified body by layering the flange portion 24 and the semi-cylindrical portion 26 of the preform for a fiber-reinforced composite material 20 over the flange portion 44 and the semi-cylindrical portion 46 of the preform for a fiber-reinforced composite material 40 respectively. In such combined preform for a fiber-reinforced composite material 50, the reinforced fiber is provided in the 0 degree direction by the flange portion 24 of the preform for a fiber-reinforced composite material 20 in the layered flange portion 54 (24, 44), and also the reinforced fiber is provided in the 0 degree direction by the semi-cylindrical portion 46 of the preform for a fiber-reinforced composite material 40 in the layered semi-cylindrical portion 56 (26, 46). Therefore, the preform for a fiber-reinforced composite material 50 not only offers the advantage that specific strength simply becomes greater because of the combination of the two preforms for a fiber-reinforced composite material 20, 40, but also provides an additional advantage that both of the flange portion 54 and the semi-cylindrical portion 56 are reinforced with the reinforced fiber disposed in the 0 degree direction.

Combining the respective precursors of a preform for a fiber-reinforced composite material 10 and 30 before bending, or combining the respective preforms for a fiber-reinforced composite material 20 and 40 after bending, furthermore unifying the two preforms for a fiber-reinforced composite material 20 and 40 to constitute the combined preform for a fiber-reinforced composite material 50, may be carried out by stitching with a sewing machine or knitting, and also by a needle-punching process.

For the process of impregnation and composition of the single or combined preforms for a fiber-reinforced composite material 20, 40, 50, an RTM (resin transfer molding) method, a VaRTM (vacuum-assisted resin transfer molding) method, an RFI (resin film infusion) method, or an autoclave method may be employed. The process described in the foregoing embodiments, unlike a manufacturing process of a conventional three-dimensional fabric, cloth or knitted fabric, braided material or prepreg material, permits direct and free disposition of the reinforced fibers in all desired directions, including a selective disposition in a predetermined direction, and since such disposing operation can be relatively easily automated utilizing a robot, the process is applicable to a mass production system for low-cost manufacturing. Besides, various inorganic fibers such as a carbon fiber, a glass fiber or a ceramic fiber as well as numerous kinds of organic fibers including an aramid fiber and so on can be employed; therefore the proposed process is applicable to an extensive use according to a position to which a fiber-reinforced composite material is to be applied. Further, since the fiber is disposed without being formed into a structure, strength of the fiber is not reduced, and since the fibers can be provided in high density, it becomes possible to form a light weighted material.

The foregoing descriptions refer to a precursor of a preform for a fiber-reinforced composite material and to a preform for a fiber-reinforced composite material having a typical L-shaped cross-section according to the present invention, however it is to be understood that the present invention is not limited to such embodiments, but is also applicable to a precursor of a preform for a fiber-reinforced composite material and to a preform for a fiber-reinforced composite material of various different shapes.

For example, the foregoing embodiments have described a precursor of a preform for a fiber-reinforced composite material having an L-shaped cross section but not constituting an entire ring shape, and to a single or combined preform for a fiber-reinforced composite material, however as shown by the two-dot chain line in FIG. 1, it is also possible to form a precursor of a preform for a fiber-reinforced composite material having an entire ring shape, and accordingly a preform for a fiber-reinforced composite material having an entire ring shape can be obtained in case of utilizing such precursor of a preform for a fiber-reinforced composite material having an entire ring shape, as shown by the two-dot chain line in FIG. 2. Also, in case of employing a precursor of a preform for a fiber-reinforced composite material of an entire cylindrical shape instead of the semi-cylindrical precursor of a preform for a fiber-reinforced composite material shown in FIG. 3, a preform for a fiber-reinforced composite material having an entire cylindrical shape can be manufactured. Such preform for a fiber-reinforced composite material having an entire ring shape can be arbitrarily formed in a perfect circle, an oval or an oblong circle.

Further, the foregoing descriptions refer to a preform for a fiber-reinforced composite material having a typical L-shaped cross-section according to the present invention, however it is to be understood that the present invention is not limited to such embodiments, but is also applicable to a preform for a fiber-reinforced composite material having various other cross-sectional shapes. FIG. 6A through 6I show just a few examples of a multitude of irregular cross-sectional shapes that can be formed by the preform for a fiber-reinforced composite material of the present invention.

Figure 6A:
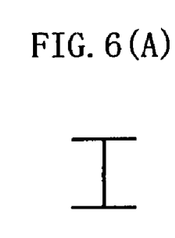
FIGS. 6A through 6I are schematic front views of the preform for a fiber-reinforced composite material, respectively showing a different irregular cross-sectional shape according to the embodiments of the present invention.
Figure 6B:
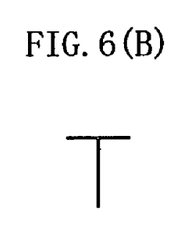
Figure 6C:
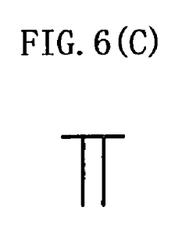
Figure 6D:
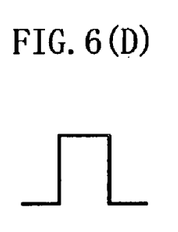
Figure 6E:
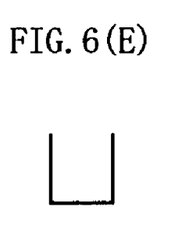
Figure 6F:
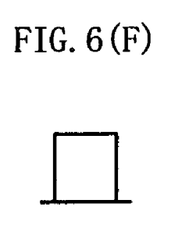
Figure 6G:
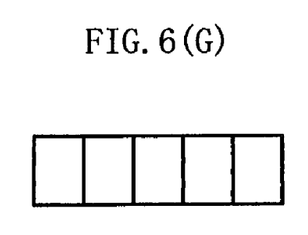
Figure 6H:
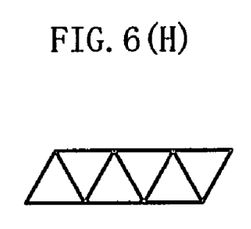
Figure 6I:
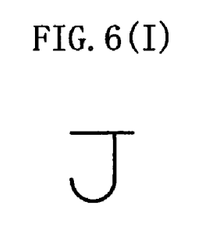

Specifically, FIG. 6A shows an I-shaped cross-sectional shape, FIG. 6B a T-shaped cross-sectional shape, FIG. 6C a II-shaped cross-sectional shape, FIG. 6D a convex cross-sectional shape, FIG. 6E a U-shaped cross-sectional shape, FIG. 6F a square cross-sectional shape, FIG. 6G a ladder-shaped cross-sectional shape, FIG. 6H a truss-shaped cross-sectional shape, and FIG. 6I a j-shaped cross-sectional shape. With respect to these cross-sectional shapes, a three-dimensional preform for a fiber-reinforced composite material having a curved shape along a longitudinal direction can be formed in a similar method to the foregoing embodiments.

Further, in the present invention, a width or a height of each part of the precursor of a preform for a fiber-reinforced composite material or a preform for a fiber-reinforced composite material according to the foregoing embodiments does not necessarily have to be constant along a longitudinal direction, but may be continuously or gradually varied. In a latter case, the reinforced fiber may be disposed forming a slight angle between one another according to a shape to be formed, instead of regular intervals in a direction of the width or the height.

Furthermore, in a precursor of a preform for a fiber-reinforced composite material or in a single or combined preforms for a fiber-reinforced composite material according to the foregoing embodiments, a thickness may be continuously or gradually varied. In this case, a reinforced fiber of a smaller diameter may be disposed in a portion of reduced thickness and a reinforced fiber of a larger diameter in a portion of a greater thickness, otherwise a reinforced fiber of the same diameter may be provided in a smaller number of layers in a portion of a reduced thickness and in a greater number of layers in a portion of a greater thickness. Also, for continuously varying a thickness, reinforced fibers of different diameters may be disposed such that a diameter thereof becomes greater or smaller in a desired direction, or alternatively a number of layers of a reinforced fiber of the same diameter may be increased or reduced in a desired direction.

ADVANTAGEOUS EFFECT OF THE INVENTION

The present invention provides a precursor of a preform for a fiber-reinforced composite material provided with a portion that can be bent along a curved line in a flat plane or a curved plane region having a predetermined extension, comprising a plurality of reinforced fibers partly disposed in parallel without being formed into a structure along the curved line for bending; and a plurality of reinforced fibers intersecting the former plurality of reinforced fibers at a predetermined angle and disposed all over the region without being formed into a structure, for bending a portion solely constituted of the latter plurality of reinforced fibers to form a desired shape; therefore a preform for a structural member of a composite material having an irregular cross-section required to have sufficient strength at a curved portion can be manufactured, and since identical reinforced fibers to those required to constitute a final shape are employed, an amount of waste can be reduced to nearly zero; besides since production efficiency can be significantly improved it becomes possible to execute a low-cost mass production. Also in disposing the reinforced fiber for reinforcing a curved portion, the reinforced fiber can be provided not only in a straight line but also in a continuous curved line, yet without crimping of the reinforced fiber. A cloth material, braided or knitted material which has been conventionally employed cannot achieve sufficient strength because of crimping of the reinforced fiber, and besides in case of cutting and layering such material for constituting a base material or multiple layers, continuity of the reinforced fiber at a curved portion could not be maintained.

The present invention provides a preform for a fiber-reinforced composite material provided with a portion that can be bent along a curved line in a flat plane or a curved plane region having a predetermined extension, comprising a plurality of reinforced fibers partly disposed in parallel without being formed into a structure along the curved line for bending; and a plurality of reinforced fibers intersecting the former plurality of reinforced fibers at a predetermined angle and disposed all over the region without being formed into a structure; and formed into a desired shape by bending a portion constituted of the latter plurality of reinforced fibers; therefore the preform can be used as a structural member of a composite material having an irregular cross-section required to have sufficient strength at a curved portion, and since identical reinforced fibers to those required to constitute a final shape are employed, an amount of waste can be reduced to nearly zero; besides since production efficiency can be significantly improved it becomes possible to execute a low-cost mass production. Also in disposing the reinforced fiber for reinforcing a curved portion, the reinforced fiber can be provided not only in a straight line but also in a continuous curved line, yet without crimping of the reinforced fiber.

The present invention provides a method of manufacturing a preform for a fiber-reinforced composite material provided with a portion that can be bent along a curved line orthogonal or substantially orthogonal to an axis in a region including a part or a whole of a cylindrical plane or a conical plane having a predetermined extension, comprising disposing a plurality of reinforced fibers orthogonally or substantially orthogonally to the axis thereof at a position along an axial direction in parallel without forming a structure; disposing a plurality of reinforced fibers intersecting the former plurality of reinforced fibers at a predetermined angle all over the region without forming a structure; and bending the portion solely constituted of the latter reinforced fiber in a desired shape along the curved line; therefore a curved preform for a fiber-reinforced composite material, which has conventionally been impossible to manufacture, can be manufactured through a simplified process, yet achieving a greater specific strength.

The invention claimed is:

1. A precursor of a preform for a fiber-reinforced composite material comprising:
    a portion bent along a curved line in one of a flat plane and a curved plane region having a predetermined length, wherein a first plurality of reinforced fibers are disposed in parallel to the curved line and form the one of the flat plane and the curved plane region, wherein a second plurality of reinforced fibers intersecting the first plurality of reinforced fibers at a predetermined angle define a first portion and extend over an entire length of the one of the flat plane and the curved plane region, and wherein the first portion is formed solely from the second plurality of reinforced fibers and is bent along the curved line to form a desired shape.

2. A preform for a fiber-reinforced composite material comprising:
    a portion bent along a curved line in one of a flat plane and a curved plane region having a predetermined length, wherein a first plurality of reinforced fibers are disposed in parallel to the curved line and form the one of the flat plane and the curved plane region, wherein a second plurality of reinforced fibers intersecting the first plurality of reinforced fibers at a predetermined angle define a first portion and extend over an entire length of the one of the flat plane and the curved plane region, and wherein the first portion is formed solely from the second plurality of reinforced fibers and is bent along the curved line to form a desired shape.

3. The preform for a fiber-reinforced composite material according claim 2, wherein a thickness varies, at least in part, according to a variation of at least one of a quantity and a diameter of the fiber to be used in the one of the flat plane region and the curved plane region.

4. The preform for a fiber-reinforced composite material according to claim 2 or 3, wherein the curved plane region defines at least part of one of a cylindrical region and a conical region, and wherein the curved line is disposed in one of an orthogonal and a substantially orthogonal orientation relative to a longitudinal axis of the one of the cylindrical region and the conical region.

5. The preform for a fiber-reinforced composite material according to claim 2 or 3, wherein the flat plane region is one of a disc-shaped region and an oval-shaped region, and wherein the curved line is one of a circular shape and an oval shape.

6. A preform structure for a fiber-reinforced composite material comprising a plurality of preforms described in any one of claims 2 or 3 for constituting a fiber-reinforced composite material selected as a base material, wherein the plurality of preforms are used in combination for forming a fiber-reinforced composite material having a predetermined three-dimensional shape; and wherein the first and second plurality of reinforced fibers have a predetermined orientation.

7. The preform for a fiber-reinforced composite material according to claim 2, wherein the preform is formed into a unified body by stitching with a sewing machine; by knitting; by a needle-punching process; or by a thereto-compression bonding wherein a reinforced fiber impregnated with a fibriform thermoplastic resin is being used.

8. The preform for a fiber-reinforced composite material according to claim 3, wherein the preform is formed into a unified body by stitching with a sewing machine; by knitting; by a needle-punching process; or by a thereto-compression bonding wherein a reinforced fiber impregnated with a fibriform thermoplastic resin is being used.

9. The preform for a fiber-reinforced composite material according to claim 4, wherein the preform is formed into a unified body by stitching with a sewing machine; by knitting; by a needle punching process; or by a thereto-compression bonding wherein a reinforced fiber impregnated with a fibriform thermoplastic resin is being used.

10. The preform for a fiber-reinforced composite material according to claim 5, wherein the preform is formed in into a unified body by stitching with a sewing machine; by knitting; by a needle-punching process; or by a thermo-compression bonding wherein a reinforced fiber impregnated with a fibriform thermoplastic resin is being used.

11. The preform for a fiber-reinforced composite material according to claim 6, wherein at least one of the plurality of preforms is formed into a unified body by stitching with a sewing machine; by knitting; by a needle-punching process; or by a thereto-compression bonding wherein a reinforced fiber impregnated with a fibriform thermoplastic resin is being used.

12. A method of manufacturing a preform for a fiber-reinforced composite material comprising:
    one of a cylindrical region and a conical region having a predetermined length, and a first portion bent along a curved line disposed in one of an orthogonal or a substantially orthogonal orientation relative to a longitudinal axis of the one of the cylindrical region and the conical region, the method comprising the steps of:
    disposing a first plurality of reinforced fibers parallel to the curved line, wherein the first plurality of reinforced fibers form the one of the cylindrical region and the conical region;
    disposing a second plurality of reinforced fibers intersecting the first plurality of reinforced fibers at a predetermined angle, wherein the first plurality of reinforced fibers form the first portion and extend over an entire length of the one of the cylindrical region and the conical region; and
    bending the first portion formed solely from the second plurality of reinforced fibers along the curved line to form a desired shape.

13. A method of manufacturing a preform for a fiber-reinforced composite material comprising:
    one of a disc-shaped plane region and an oval-shaped plane region having a predetermined length; and
    a first portion bendable along one of a circular and an oval shaped curved line defined in the one of the disc-shaped plane region and the oval-shaped plane region, the method comprising the steps of:
    disposing a first plurality of reinforced fibers in parallel to the one of the circular and the oval shaped curved line, wherein the first plurality of reinforced fibers form the one of the disc-shaped plane region and the oval-shaped plane region;

disposing a second plurality of reinforced fibers intersecting the first plurality of reinforced fibers at a predetermined angle, wherein the first plurality of reinforced fibers form the first portion and extend over an entire length of the one of the disc-shaped plane region and the oval-shaped plane region; and bending the first portion formed solely from the second plurality of reinforced fibers along the one of the circular and the oval-shaped curved line to form a desired shape.

14. A method of manufacturing a preform structure for a fiber-reinforced composite material comprising the steps of:

selecting a plurality of preforms for a fiber-reinforced composite material, wherein each preform comprises:
a curved plane region having a predetermined length, and
a first portion bendable along a curved line disposed in a flat plane, wherein a first plurality of reinforced fibers disposed in parallel to said curved line forms the curved plane region, wherein a second plurality of reinforced fibers intersecting the first plurality of reinforced fibers at a predetermined angle forms the first portion and extends over an entire length of the curved plane region, and wherein the first portion is bent along the curved line to form a desired shape; and combining the plurality of preforms for a fiber-reinforced composite material.

15. A preform structure for a fiber-reinforced composite material comprising a plurality of preforms according to claim 4 for constituting a fiber-reinforced composite material, wherein the plurality of preforms are used in combination for forming a fiber-reinforced composite material having a predetermined three-dimensional shape, and wherein the first and second plurality of reinforced fibers have a predetermined orientation.

16. A preform structure for a fiber-reinforced composite material comprising a plurality of preforms according to claim 5 for constituting a fiber-reinforced composite material, wherein the plurality of preforms are used in combination for forming a fiber-reinforced composite material having a predetermined three-dimensional shape, and wherein the first and second plurality of reinforced fibers have a predetermined orientation.

17. The preform structure for a fiber-reinforced composite material according to claim 15, wherein a preform of the plurality of preforms is formed in a unified body by stitching with a sewing machine; by knitting; by a needle-punching process; or by a thereto-compression bonding wherein a reinforced fiber impregnated with a fibriform thermoplastic resin is being used.

18. The preform structure for a fiber-reinforced composite material according to claim 16, wherein a preform of the plurality of preforms is formed in a unified body by stitching with a sewing machine; by knitting; by a needle-punching process; or by a thereto-compression bonding wherein a reinforced fiber impregnated with a fibriform thermoplastic resin is being used.

19. A method of manufacturing a preform structure for a fiber-reinforced composite material comprising the steps of:

selecting a plurality of preforms for a fiber-reinforced composite material, wherein each preform comprises:
one of a disc-shaped plane region and an oval-shaped plane region having a predetermined length; and
a first portion bendable along one of a circular and an oval shaped curved line defined in the one of the disc-shaped plane region and the oval-shaped plane region, wherein a first plurality of reinforced fibers disposed in parallel to the one of the circular and the oval-shaped curved line forms the one of the disc-shaped plane region and the oval-shaped plane region, wherein a second plurality of reinforced fibers intersecting the first plurality of reinforced fibers at a predetermined angle forms the first portion and extends over an entire length of the one of the disc-shaped plane region and the oval-shaped plane region, and wherein the first portion is bent along the one of the circular and the oval-shaped curved line for forming a desired shape; and combining the plurality of preforms for a fiber-reinforced composite material.

* * * * *